United States Patent
Anfindsen

(10) Patent No.: US 6,584,378 B1
(45) Date of Patent: Jun. 24, 2003

(54) DEVICE AND A METHOD FOR DETERMINING COORDINATES AND ORIENTATION

(75) Inventor: Ole Arnt Anfindsen, Sandnes (NO)

(73) Assignee: ABB Flexible Automation, Byrne (NO)

(*) Notice: Subject to any disclaimer, the term of this patent is extended or adjusted under 35 U.S.C. 154(b) by 0 days.

(21) Appl. No.: 10/111,281

(22) PCT Filed: Oct. 24, 2000

(86) PCT No.: PCT/IB00/01529
§ 371 (c)(1),
(2), (4) Date: Apr. 22, 2002

(87) PCT Pub. No.: WO01/30545
PCT Pub. Date: May 3, 2001

(30) Foreign Application Priority Data

Oct. 29, 1999 (SE) .............................. 9903905

(51) Int. Cl.[7] .............................. G06F 19/00
(52) U.S. Cl. .............. 700/245; 700/246; 700/247; 700/248; 700/249; 700/250; 700/251; 700/252; 700/253; 700/254; 700/255; 700/256; 700/257; 700/258; 700/259; 700/260; 700/261; 700/262; 700/263; 700/264; 318/568.1; 318/568.11; 318/568.12; 318/568.13; 318/568.14; 318/568.15; 318/568.16; 901/2; 901/8; 901/9; 901/16; 901/23; 901/32; 701/1; 701/11; 701/21; 701/23; 219/121.61; 219/121.62; 219/121.63; 219/121.64; 219/125.11; 219/125.12; 219/125.13; 414/729

(58) Field of Search .................. 700/37, 192, 245–264; 318/568.1, 568.11–568.17, 568.21; 901/2, 8, 9, 16, 23, 32, 41, 42, 46, 47; 701/1, 11, 21, 23; 219/121.61–121.64, 121.82, 125.11, 125.12, 125.13; 414/729, 744.4, 815, 917, 941

(56) References Cited

U.S. PATENT DOCUMENTS 3,795,911 A * 3/1974 Hammack ............... 414/591
3,866,229 A * 2/1975 Hammack ............... 417/331

(List continued on next page.)

FOREIGN PATENT DOCUMENTS

| DE | 2 731 041 A1 | 1/1978 |
| EP | 0 440 588 A1 | 8/1991 |
| EP | 0 850 730 A1 | 7/1998 |
| FR | 2 737 024 A1 | 7/1995 |
| JP | 1 139021 | 5/1989 |
| JP | 5 318359 | 3/1993 |

OTHER PUBLICATIONS

Fraczed et al., Calibration of multi robot system without and under load usion electronic, 1999, IEEE, pp. 71–75.*
Preising et al., Robot performance measurement and calibration using a 3D computer vision system, 1991, IEEE, pp. 2079–2084.*
Wi et al., Design of robot accuracy compensator after Calibration, 1988, IEEE, pp. 780–785.*

Primary Examiner—William A. Cuchlinski, Jr.
Assistant Examiner—McDieunel Marc
(74) Attorney, Agent, or Firm—Dykema Gossett, PLLC

(57) ABSTRACT

When determining coordinates of a point of an object (2) in a reference system of coordinates and the orientation of the object in the space in a measuring position assumed by the object, the object is moved from a start position having known coordinates and a known orientation to a measuring position while detecting this movement. Said coordinates and the orientation of the object in the measuring position are calculated from information from this detection and about the start position. Furthermore, the acceleration and retardation of the object are measured during the movement, and the coordinates and the orientation of the object in the measuring position are calculated from information from this measurement.

15 Claims, 1 Drawing Sheet

U.S. PATENT DOCUMENTS

| | | | |
|---|---|---|---|
| 4,825,394 A | * 4/1989 | Beamish et al. | 414/217.1 |
| 5,819,206 A | 10/1998 | Horton et al. | 702/150 |
| 5,988,862 A | * 11/1999 | Kacyra et al. | 74/422 |
| 6,236,896 B1 | * 5/2001 | Watanabe et al. | 700/248 |
| 6,282,459 B1 | * 8/2001 | Ballantine et al. | 700/245 |
| 6,349,245 B1 | * 2/2002 | Finlay | 700/245 |
| 6,356,807 B1 | * 3/2002 | McGee et al. | 700/253 |
| 6,374,158 B1 | * 4/2002 | Fusaro, Jr. | 700/254 |
| 6,430,472 B1 | * 8/2002 | Boillot et al. | 700/245 |

* cited by examiner

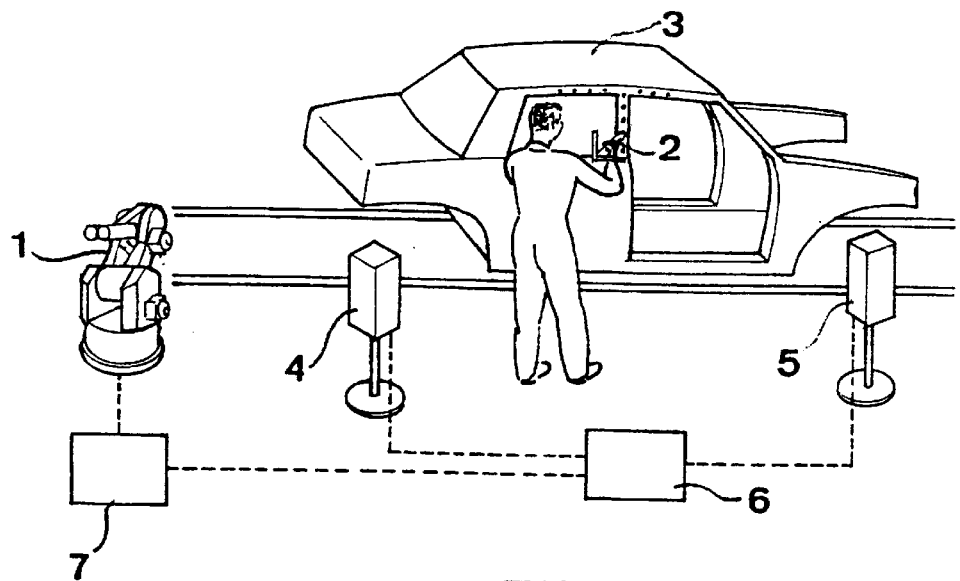
Fig 1
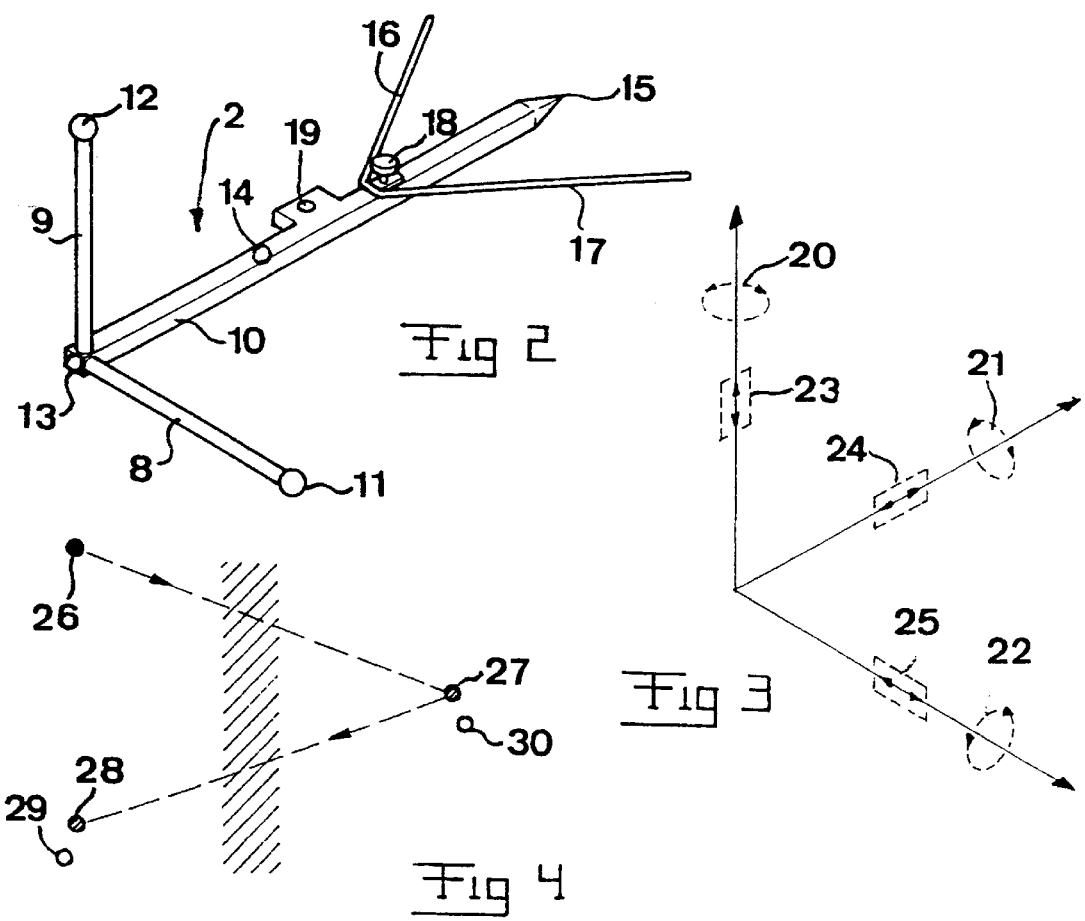
Fig 2
Fig 3
Fig 4

DEVICE AND A METHOD FOR DETERMINING COORDINATES AND ORIENTATION

FIELD OF THE INVENTION AND PRIOR ART

The present invention relates to a device for determining coordinates of a point of an object in a reference system of coordinates and the orientation of the object in the space in a measuring position assumed by the object, said object being adapted to be moved from a start position having known coordinates and orientation to said measuring position, the device comprising means adapted to detect parameters associated with said movement and members adapted to calculate said coordinates and orientation of the object in the measuring position from information from the detecting means about said parameters and about the start position, and a method according to the preamble of the appended independent method claim.

The invention relates in particular, but not exclusively, to such devices used for programming of robots, such as welding robots or robots for spray application of paint, which for example "work" with vehicle bodies. This particular field of use of such a device will hereinafter be described for illuminating the problem upon which the present invention is based.

The object of the device is usually constituted by a hand tool being moved by hand by a person between different positions along a work piece, such as a vehicle body, for storing the coordinates and the direction of a tool of the robot in these positions. The control unit for the robot interpolates successively the different positions stored for obtaining a movement of path of the tool of the robot.

Said known coordinates in one position, such as a start position, are usually obtained by the fact that one or more cameras are watching different optical points of the object placed in this position, and the real coordinates and orientation of the object in said start position are determined through the information so obtained from the camera or the cameras. However, it is sometimes necessary to move the object to parts along the path of movement of the tool of the robot, which are hidden by for example the object with which the robot shall "work", such as a vehicle body. This if for example the case with different positions being located inside or in any corner of the vehicle body. The object is in such cases moved as mentioned from the start position to the measuring position hidden at the same time as parameters associated with the movement are detected and said calculation of coordinates and orientation of the object in the measuring position may then be carried out from information from the detecting means about these parameters and about the start position.

Until now this has been made by using the robot itself for storing such positions and by measuring the rotation of the different robot arms about their axes. However, this is a very cumbersome and cost demanding way for calculating coordinates and orientation in said measuring position.

It is already known through for example DE 19626459-A1 and BE-1010211-A6 how an object may be moved in the way mentioned above for storing the movement of path of a robot between different positions.

SUMMARY OF THE INVENTION

The object of the present invention is to provide a device and a method of the type defined in the introduction, which enables a considerably easier determination of coordinates and orientation of a said measuring position than has been possible before.

This object is according to the invention obtained by the fact that in such a device said means comprise accelerometers arranged on the object and adapted to detect accelerations and retardations of the object during said movement, and that the calculating member is adapted to calculate said coordinates and orientation of the object in the measuring position on the basis of information from the accelerometers.

The coordinates and the orientation of the object in said measuring position may hereby be determined with a high accuracy through very simple means.

According to a preferred embodiment of the invention said means comprise six accelerometers, three adapted to detect acceleration and retardation for rotation in three planes being orthogonal with respect to each other and three adapted for detection of acceleration and retardation of the object in the direction of the perpendicular to one of said planes each. By arranging six such accelerometers all the components of the movement of the object at the movement between the start position and the measuring position may be reliably detected.

According to another preferred embodiment of the invention the object is intended to be moved from said measuring position to a third position having known coordinates and orientation of the object, the accelerometers are adapted to detect accelerations and retardations during this movement, the calculating member is adapted to calculate the coordinates and the orientation of the object in said third position from information from the accelerometers, a member is adapted to compare the values of the coordinates and orientation so calculated with the real ones, and the calculating member is adapted to calculate new coordinates and orientation for the object in said measuring position from the acceleration and retardation data detected during the first movement possibly corrected in accordance with deviations of coordinates and orientation established at said comparison. It is through this comparison possible to increase the accuracy further when determining the coordinates and the orientation of the object in said measuring position, thanks to the compensating for possible errors in the measuring of the accelerometers made possible here.

According to another preferred embodiment of the invention the device comprises a member adapted to measure the time needed for the movement of the object between the start position and the measuring position and between the measuring position and the third position and the calculating member is adapted to carry out an application of a weight factor on the correction as a consequence of said deviations depending upon the relations between the times needed for the two movements. The compensation may in this way get even better and the reliability of the values calculated for the coordinates and the orientation in the measuring position may be increased further.

According to another preferred embodiment of the invention the object is adapted to be moved between different positions along a path of movement desired for a part of a robot for storing coordinates and orientation of said part of the robot in these positions. A movement of path for a robot may by this be stored in a rapid and efficient way and with a high accuracy also for positions not allowing optical registration of the position of such an object. It is then advantageous that the calculating member is adapted to calculate coordinates for a centre point of a tool of a robot in said measuring position, in which this centre point for example in the case of a robot for spray application of paint corresponds to the desired centre hit point for the paint beam of the nozzle. In the case of a robot for spot welding the measuring position corresponds to the desired position for the tip of the welding electrode of the robot.

Another preferred embodiment of the invention is exactly related to that said object is adapted to be moved to bear against an object, which a robot is intended to treat while assuming said measuring position, which makes it easy to rapidly and with accuracy obtain exactly the measuring position asked for.

According to another preferred embodiment of the invention one or more cameras are arranged to watch the object and members are arranged to calculate said known coordinates and orientation on the basis of information from the camera or the cameras, and said measuring position is located outside the field of view for said camera or cameras. The device according to the invention is in exactly such a case of particular use, i.e. when an optical determination of different positions of the object is to be carried out and some of these positions are hidden and by that do not allow any optical determination.

The invention also relates to methods for determining coordinates of the point of an object in a reference system of coordinates and the orientation of the object in the space in a measuring position assumed by the object according to the appended method claims.

The advantages of these methods appear with no doubt from the discussion above of the device according to the invention and the preferred embodiments thereof.

Further advantages as well as advantageous features of the invention appear from the following description and the other dependent claims.

BRIEF DESCRIPTION OF THE DRAWINGS

With respect to the appended drawing, below follows a description of a preferred embodiment of the invention cited as an example.

In the drawing:

FIG. 1 is a schematical view illustrating a device of the type to which the invention belongs in a state of use, FIG. 2 is a detailed view of an object being a part of the device according to FIG. 1, FIG. 3 is a schematical view illustrating how accelerometers are arranged and designed to act according to the invention for the object according to FIG. 2 in a device according to a preferred embodiment of the invention, and FIG. 4 is a schematical view illustrating consecutive positions of an object according to the invention and intended to facilitate the explanation of the method according to the invention.

DETAILED DESCRIPTION OF A PREFERRED EMBODIMENT OF THE INVENTION

It is schematically illustrated in FIG. 1 what a device according to the invention for determining coordinates of a point of an object in a reference system of coordinates and the orientation of the object in the space in a measuring position assumed by the object may look like. It is here intended to determine so many positions along a path of movement of a robot 1 that a control system may interpolate the movement between these positions and by that control the robot along a path of movement desired. The control program of the robot is in this way obtained rapidly and with a high accuracy by moving an object 2 by a person to bear against an object 3, here a vehicle body, to be treated by the robot and the coordinates and the orientation of the object are determined for each such position. This is obtained by directing two cameras 4, 5, preferably CCD cameras, towards the vehicle body so that they have the largest possible part thereof within its field of view. The cameras are preferably arranged at a distance of 90° with respect to each other with respect to an imagined circle therethrough around the vehicle body.

The cameras are adapted to send information about the picture they receive to a member 6 in the form of a computer for calculating the coordinates of a given point of the object in the system of Cartesian coordinates and the orientation of the object and send this information further to a unit 7 adapted to control the robot later on on the basis of the position values calculated. It is then possible to use only one single camera, but it is then more difficult to obtain a reliable position determination of the object.

It is illustrated in FIG. 2 what an object 2 for use in the way described with reference to FIG. 1 may look like. This object has three arms being perpendicular to each other according to an axis each in a system of Cartesian coordinates. An optical reference point 11, 12 in the form of a small ball is arranged on the outermost end of two of the arms 8, 9. Such optical reference points 13, 14 are also arranged in the origo of the system of coordinates and in a position along, the arm 10, respectively. The optical reference points 11–14 may be active light signs having an illumination sequence making them easy to identify individually for the control member 6. It is the position of these four points in the picture information sent out from the cameras to the calculating member that is utilized by the calculating member for calculating the coordinates of a point of the object, more exactly the tip 15 of the longer arm 10.

This tip 15, which corresponds to the tool centre point (TCP=Tool Centre Point), is when determining the different positions brought to bear against the object in question, such as a vehicle body 3 according to FIG. 1. Two marker tines 16, 18 protruding from the arm 10 are also utilized, the extremities of which may be connected by a line running through the tip 15 for setting the correct orientation of the object with respect to the vehicle body. The marker tines 16, 17 may be turned stepwise with 90° around the longitudinal axis of the arm 10 by loosening a setting knob 18 for maintaining a good geometry of the optical reference points with respect to the cameras 4, 5. The position set is automatically registered in the control member 6. When the operator has placed the object in the desired position this actuates a setting member 19, which preferably sends a signal to the calculating member 6 saying that this shall calculate coordinates and orientation of the object in the instantaneous position thereof, i.e. on the basis of the picture information exactly when recorded by the cameras.

It is characterizing for the device according to the invention that the object, such as the one shown in FIG. 2, is provided with accelerometers adapted to detect accelerations and retardations of the object during the movement thereof. More exactly, six accelerometers are arranged on the arms of the object, three 20–22 for detecting acceleration and retardation for rotation of the object in three planes being orthogonal to each other and three 23–25 for detecting acceleration and retardation of the object in the direction of the perpendicular to one said plane each. How these are arranged to detect accelerations and retardations in this way is schematically illustrated in FIG. 3. This arrangement of the accelerometers makes it possible to determine coordinates and orientation of the object in the positions which may not be determined through information from the cameras since the object is hidden in these positions by the other object or by the operator.

The position determination by means of the accelerometers takes place in the following way. When the object has the point 15 in a so called start position 26 (see FIG. 4), the coordinates of which and the orientation of the object associated therewith may be regarded as known since they may be calculated on the basis of information from the cameras, and the object is moved with the tip 15 to a so called measuring position 27, in which the object is entirely or partially hidden, the accelerometers detect accelerations and retardations of the object during this movement and send information thereabout to the calculating member. This sending of this information may take place once the measuring position 27 has been reached by actuation of the setting member 19 by the operator. The calculating member may on the basis of this information and information of coordinates and orientation associated with the start position and information about the time needed for the movement calculate the coordinates for the tip 15 in the measuring position 27 and the orientation of the object when it is held with the tip 15 in this position. It would for sure be possible to store the values so calculated as data for the hidden measuring position 27, but the invention intends to increase the accuracy when determining these data by proceeding in the following way: Once the measuring position 27 has been assumed by the object the object is moved to the next position 28, here called the third, in which the object may be regarded to have known coordinates and orientation since the object here is completely visible to the cameras. During the movement from the measuring position 27 to the third position 28 the acceleration and retardation of the object are measured through the accelerometers 20–25. Coordinates and orientation of the object in this third position is then calculated from information from this measurement. Thus, during this calculation it is considered that the object has been moved from the calculated measuring position and then to a new position. Thus, the coordinates and the orientation of the object calculated in the third position are established through two consecutive calculations. When this has been done the values for the third position 28 are compared with those possible to be optically determined with a high accuracy through the cameras. We now assume that the position calculated differs somewhat both with respect to coordinates and orientation from the third position 28 such as shown by the ring 29 in FIG. 4. A comparison of the calculated and so called real position parameters is made and a new calculation of the hidden measuring position is made on the basis of the difference resulting from this comparison, and the measuring position may now be considered to be erroneously calculated to be located at the ring 30. A weight factor is applied to this correction depending upon the relation between the times needed for the movement between the points 26 and 27 and 27 and 28, so that when for example a time of 0.3 sec is needed for the first movement and 0.5 sec for the second one ⅜ of the deviation established in the third position is utilized for correction of the values calculated for the measuring position 27. It may in this way be compensated for deviations in the acceleration and retardation parameters of the accelerometers. It is important that the movement of the object to the hidden position and then out to a visible position is comparatively fast for obtaining a good measuring result. A background activity continuously treating data from the accelerometers and comparing them with optically measured positions may be carried out in the member 6 for further improving the accuracy. By doing this continuously during the movement of the object between different positions associated "gain factors" and "offset values" may be determined through a known control theory at the same time as the influence of the gravitation may be masked away.

The invention is of course not in any way restricted to the preferred embodiment described above, but many possibilities to modifications thereof will be apparent to a person skilled in the art without departing from the basic idea of the invention.

It is pointed out that the invention is not at all restricted to the fact that the object is entirely or partially hidden in said measuring position, but it is also conceivable to use the device for determining coordinates and orientation of an object in positions in which the object is well visible. This would be conceivable in situations without any optical detection and when certain positions are determined in advance and the object is moved between these known positions for defining one or more positions therebetween.

It is also possible to arrange less optical reference points than four on the object, but the measuring may then in some positions be more difficult.

What is claimed is:

1. A method for determining coordinates of a point (15) of an object (2) in a reference system of coordinates and the orientation of the object in space in a measuring position (27) assumed by the object, said object being moved from a start position (26) having known coordinates and a known orientation to the measuring position while detecting this movement, said coordinates and the orientation of the object in the measuring position being calculated from information about this detection and about the start position, characterized in that the acceleration and retardation of the object is measured during the movement, and that said coordinates and orientation of the object in said measuring position is calculated from information about this measuring.

2. A method according to claim 1, characterized in that the acceleration and retardation of the object at said measuring is detected with respect to rotation in three reference planes being orthogonal to each other and with respect to translation in the direction of the perpendicular to the respective reference plane in a system of Cartesian coordinates formed by these perpendiculars.

3. A method according to claim 1, characterized in that the object is moved from the measuring position (27) to a third position (28) having known coordinates and orientation of the object while measuring the acceleration and retardation of the object during this movement, that coordinates and orientation of the object in this third position is calculated from information from said two measurements, that the coordinates and the orientation calculated for the third position are compared with the real ones, and that coordinates and orientation of the object in said measuring position is then calculated from said measurement of the acceleration and retardation at the movement from the start position to the measuring position while making a correction in accordance with possible deviations of the coordinates and orientation established in said comparison.

4. A method according to claim 3, characterized in that the time needed for the movement of the object between the start position (26) and the measuring position (27) and between the measuring position and the third position (28) is measured, and that said correction is made with a weight factor applied on said deviations depending upon the relation between the times needed for the two movements.

5. A method according to claim 1, characterized in that it is an object (2) that is moved between said positions for storing coordinates and orientation in these positions as positions for a part of a robot in a movement path for this.

6. A method according to claim 1, characterized in that said known coordinates and orientation of the object is obtained by the fact that one or more cameras (4, 5) have the object within their field of view in the position (26, 28) in question, so that these coordinates and orientation may be calculated from information from the camera or cameras, and that the object disappears from said field of view of said camera or cameras when moving from the start position (26) to the measuring position (27).

7. A device according to claim 6, characterized in that the object (2) is adapted to be moved between different positions (26–28) along a path of movement desired for a part of a robot for storing coordinates and orientation of said part of the robot in these positions.

8. A device according to claim 7, characterized in that the calculating member (6) is adapted to calculate coordinates for a centre point of a tool of a robot in said measuring position.

9. A device according to claim 7, characterized in that the calculating member (6) is adapted to calculate the coordinates and the orientation of a point associated with a spray nozzle of a robot for spray application of paint.

10. A device according to claim 9, characterized in that said object (2) is adapted to be moved to bear against an object (3), which has a robot is intended to treat while assuming said measuring position.

11. A device according to claim 10, characterized in that one or more cameras (4, 5) are arranged to watch the object (2) and members (6) are arranged to calculate said known coordinates and orientation on the basis of information from the camera or the cameras, and that said measuring position (27) is located outside the field of view for said camera or cameras.

12. A device for determining coordinates of a point (15) of an object (2) in a reference system of coordinates and the orientation of the object in the space in a measuring position (27) assumed by the object, said object being adapted to be moved from a start position (26) having known coordinates and orientation to said measuring position, the device comprising means (20–25) adapted to detect parameters associated with said movement and members (6) adapted to calculate said coordinates and orientation of the object in the measuring position from information from the detecting means about said parameters and about the start position, characterized in that said means comprise accelerometers (20–25) arranged on the object and adapted to detect accelerations and retardations of the object during said movement, and that the calculating member (6) is adapted to calculate said coordinates and orientation of the object in the measuring position on the basis of information from the accelerometers.

13. A device according to claim 12, characterized in that said means comprise six accelerometers (20–25), three (20–22) adapted to detect acceleration and retardation for rotation in three (23–25) planes being orthogonal with respect to each other and three adapted for detection of acceleration and retardation of the object in the direction of the perpendicular to one of said planes each.

14. A device according to claim 12, characterized in that the object is intended to be moved from said measuring position (27) to a third position (28) having known coordinates and orientation of the object (2), that the accelerometers (20–25) are adapted to detect accelerations and retardations during this movement, that the calculating member (6) is adapted to calculate the coordinates and the orientation of the object in said third position from information from the accelerometers, that a member is adapted to compare the values of the coordinates and orientation so calculated with the real ones, and that the calculating member is adapted to calculate new coordinates and orientation for the object in said measuring position from the acceleration and retardation data detected during the first movement possibly corrected in accordance with deviations of coordinates and orientation established at said comparison.

15. A device according to claim 14, characterized in that it comprises a member adapted to measure the time needed for the movement of the object between the start position (26) and the measuring position (27) and between the measuring position and the third position (28) and that the calculating member is adapted to carry out an application of a weight factor on the correction as a consequence of said deviations depending upon the relations between the times needed for the two movements.

* * * * *